United States Patent
Rosen et al.

(10) Patent No.: US 12,555,405 B2
(45) Date of Patent: Feb. 17, 2026

(54) OPTICAL LIGHT REDIRECTING STACK INCLUDING LIGHT REDIRECTING LAYERS WITH TRUNCATED STRUCTURES

(71) Applicant: 3M INNOVATIVE PROPERTIES COMPANY, St. Paul, MN (US)

(72) Inventors: David A. Rosen, North Saint Paul, MN (US); Bharat R. Acharya, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/014,610

(22) PCT Filed: Jul. 2, 2021

(86) PCT No.: PCT/IB2021/055977
§ 371 (c)(1),
(2) Date: Jan. 5, 2023

(87) PCT Pub. No.: WO2022/013673
PCT Pub. Date: Jan. 20, 2022

(65) Prior Publication Data
US 2023/0252817 A1    Aug. 10, 2023

Related U.S. Application Data

(60) Provisional application No. 63/053,235, filed on Jul. 17, 2020.

(51) Int. Cl.
*G06V 40/13* (2022.01)
*G02B 5/02* (2006.01)
(Continued)

(52) U.S. Cl.
CPC ...... *G06V 40/1318* (2022.01); *G02F 1/13338* (2013.01); *G02F 1/133507* (2021.01);
(Continued)

(58) Field of Classification Search
CPC .......................... G02B 5/0231; G02B 5/0242
See application file for complete search history.

(56) References Cited

U.S. PATENT DOCUMENTS

2009/0213464 A1* 8/2009 Kurachi ............ B29D 11/0073
156/308.4
2010/0302185 A1 12/2010 Han et al.
(Continued)

FOREIGN PATENT DOCUMENTS

WO    2008024698 A1    2/2008
WO    2012138495 A1    10/2012
(Continued)

OTHER PUBLICATIONS

International Search Report for PCT International Application No. PCT/IB2021/055977, mailed on Oct. 8, 2021, 5 pages.

*Primary Examiner* — Lauren Nguyen
(74) *Attorney, Agent, or Firm* — Jonathan L. Tolstedt

(57) ABSTRACT

An optical stack includes stacked first and second light redirecting layers, each light redirecting layer including a plurality of truncated first structures, each truncated first structure with opposing side surfaces making an angle of between about 60 degrees to about 120 degrees with each other and a substantially planar top surface joining the opposing side surfaces, and a plurality of untruncated second structures, each untruncated second structure with opposing side surfaces making an angle of between about 60 degrees to about 120 degrees with each other and meeting at peak, wherein the peaks of the untruncated second structures and the substantially planar top surfaces of the first truncated structures substantially lie in the same plane.

12 Claims, 5 Drawing Sheets

(51) Int. Cl.
    *G02F 1/1333*     (2006.01)
    *G02F 1/1335*     (2006.01)
    *G02F 1/13357*    (2006.01)

(52) U.S. Cl.
    CPC ...... *G02F 1/133606* (2013.01); *G02B 5/0242* (2013.01); *G02F 2203/11* (2013.01)

(56) References Cited

U.S. PATENT DOCUMENTS

| | | | |
|---|---|---|---|
| 2014/0133128 A1* | 5/2014 | Oh | G02B 6/0038 |
| | | | 362/97.1 |
| 2020/0110311 A1 | 4/2020 | Gordon et al. | |
| 2020/0183065 A1* | 6/2020 | Haag | G02F 1/133615 |
| 2020/0379162 A1* | 12/2020 | Chen | G02B 6/0053 |

FOREIGN PATENT DOCUMENTS

| | | | | |
|---|---|---|---|---|
| WO | 2021070027 A1 | 4/2021 | | |
| WO | WO-2021-191749 | * | 9/2021 | ......... G02F 1/13357 |

* cited by examiner

OPTICAL LIGHT REDIRECTING STACK INCLUDING LIGHT REDIRECTING LAYERS WITH TRUNCATED STRUCTURES

CROSS REFERENCE TO RELATED APPLICATIONS

This application is a national stage filing under 35 U.S.C. 371 of PCT/IB2021/055977, filed Jul. 2, 2021, which claims the benefit of Provisional Application No. 63/053,235, filed Jul. 17, 2020; the disclosures of which are incorporated by reference in their entireties herein.

SUMMARY

In some aspects of the present description, an optical stack is provided, including stacked first and second light redirecting layers, each light redirecting layer including a plurality of truncated first structures and a plurality of untruncated second structures. Each truncated first structure has opposing side surfaces making an angle of between about 60 degrees to about 120 degrees with each other and a substantially planar top surface joining the opposing side surfaces. Each untruncated second structure has opposing side surfaces making an angle of between about 60 degrees to about 120 degrees with each other and meeting at a peak, wherein the peaks of the untruncated second structures and the substantially planar top surfaces of the first truncated structures substantially lie in the same plane.

In some aspects of the present description, an optical system is provided, including a liquid crystal display panel, an infrared detector, a reflecting layer disposed between the display panel and the infrared detector, and the optical stack including stacked first and second light redirecting layers described above disposed between the display panel and the reflecting layer. For substantially normally incident light and for each of a first polarization state and an orthogonal second polarization state, the reflecting layer may reflect at least 70% of the incident light for each wavelength in a human-visible wavelength range, and may transmit at least 70% of the incident light for the at least one wavelength in an infrared wavelength range.

DETAILED DESCRIPTION

Figure 1A:
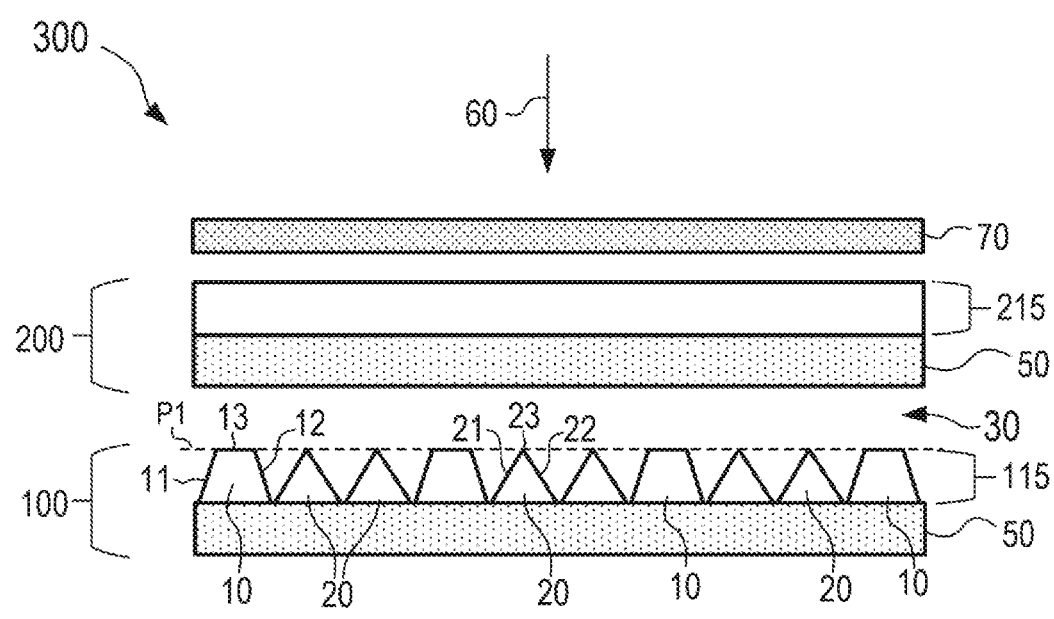
FIG. 1A is a side view of an optical stack with truncated structures, in accordance with an embodiment of the present description.
Figure 1A:
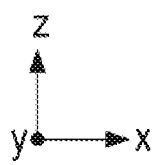

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In order to maximize the brightness of a display, many modern optical systems include one or more light redirecting layers (e.g., brightness enhancement films) which typically have rows of extended, linear structures arranged across the surface of the light redirecting layer. For example, rows of extended, linear, prismatic structures arranged as alternating sharp valleys and sharp peaks may redirect and collimate the light emitted by the display to provide maximum display brightness. However, these sharp prisms may split and/or distort the light from images passing into a display system (e.g., light reflected from a human fingerprint in proximity to the display surface, to be read by a fingerprint sensor underneath the display). According to some aspects of the present description, an optical stack wherein at least some of the linear, light-redirecting structures are truncated, providing a flat surface which allows light to pass with little or no distortion, is provided.

According to some aspects of the present description, an optical stack includes stacked first and second light redirecting layers. In some embodiments, each light redirecting layer may include a plurality of truncated first structures and a plurality of untruncated second structures. In some embodiments, each truncated first structure may have opposing side surfaces making an angle of between about 60 degrees to about 120 degrees with each other and a substantially planar top surface joining the opposing side surfaces. In some embodiments, each untruncated second structure may have opposing side surfaces making an angle of between about 60 degrees to about 120 degrees with each other and meeting at a peak, wherein the peaks of the untruncated second structures and the substantially planar top surfaces of the first truncated structures substantially lie in the same plane. In some embodiments, the optical stack may further include an adhesive layer bonding the first light redirecting layer to the second light redirecting layer.

In some embodiments, the truncated first structures and the untruncated second structures of the first light redirecting layer may be linear structures extending along a first direction (e.g, extending in the y-axis of the layer) and arranged along an orthogonal second direction (e.g., arranged along an x-axis orthogonal to the y-axis). In some embodiments, the truncated first structures and untruncated second structures of the second light redirecting layer may be linear structures extending along a third direction (e.g., an x'-axis, different from the x-axis of the first light redirecting area) and arranged along an orthogonal fourth direction (e.g., an y'-axis, different from the y-axis of the first light redirecting area). In some embodiments, the second direction and the third direction may make an angle β with each other. In some embodiments, the angle β may be between about 0 degrees and about 50 degrees.

In some embodiments, the substantially planar top surfaces of the truncated first structures of each of the first and second light redirecting layers may have an average width W1, where W1 is at least about 2 microns, or at least about 3 microns, or at least about 4 microns.

In some embodiments, the first light redirecting layer may be a monolithic construction including the first and second structures. In some embodiments, the first and second structures of the first light redirecting layer may be disposed on a substrate. In some embodiments, the second light redirecting layer may be a monolithic construction including the first and second structures. In some embodiments, the first and second structures of the second light redirecting layer may be disposed on a substrate.

In some embodiments, the optical stack may have a specular optical transmittance of between about 10% and about 80%, or between about 10% to 60%, or between about 10% to 50%, or between about 10% to 40% for substantially normally incident light and for at least one wavelength in an infrared wavelength range extending from about 750 nm to about 1100 nm.

In some embodiments, the optical stack may further include a reflective polarizer. In some embodiments, the second light redirecting layer may be disposed between the reflective polarizer and the first light redirecting layer. In some embodiments, for substantially normally incident light and for a human-visible (or "visible") wavelength range extending from about 450 nm to about 650 nm and an infrared wavelength range extending from about 750 nm to about 1100 nm, the reflective polarizer transmits at least 40%, or at least 45%, or at least 50% of the incident light for a first polarization state (e.g., light polarized to a first axis of the reflective polarizer, such as the "x-axis") for each wavelength in the visible wavelength range, and reflects at least 70%, or at least 80%, or at least 90% of the incident light for an orthogonal second polarization state (e.g., light polarized to a second, orthogonal axis, such as the "y-axis") for each wavelength in the visible wavelength range. In some embodiments, the reflective polarizer may transmit at least 40%, or at least 45%, or at least 50% of the incident light for each of the first and second polarization states for at least one wavelength in the infrared wavelength range. In some embodiments, the at least one wavelength in the infrared wavelength range may be one or more wavelengths of about 850 nm and about 940 nm. The first and second polarization states may be any two orthogonal polarization states for light, such as, for example, linear p-polarized (p-pol) light and linear s-polarized (p-pol) light.

According to some aspects of the present description, an optical system includes a liquid crystal display panel, an infrared detector, a reflecting layer disposed between the display panel and the infrared detector, and an optical stack including stacked first and second light redirecting layers (e.g., the optical stack described elsewhere herein) disposed between the display panel and the reflecting layer. In some embodiments, for substantially normally incident light and for each of a first polarization state and an orthogonal second polarization state, the reflecting layer may reflect at least 70% of the incident light for each wavelength in a human-visible (or "visible") wavelength range, and may transmit at least 70% of the incident light for the at least one wavelength in an infrared wavelength range. In some embodiments, the optical system may further include an infrared light source (e.g., an infrared-emitting LED) for emitting light having the at least one wavelength in the second wavelength range toward an object disposed proximate the optical system (e.g., a finger near the liquid crystal display panel), the object reflecting the emitted light toward the infrared detector, the infrared detector detecting the reflected emitted light (e.g., detecting the patterns of light reflected by a fingerprint). In some embodiments, the optical system may have a specular optical transmittance of between about 5% and about 20% for at least one wavelength in an infrared wavelength range extending from about 750 nm to about 1100 nm.

Turning now to the figures, FIG. 1A is a side view of an optical stack with truncated structures according to the present description. In some embodiments, an optical stack 300 includes a first light redirecting layer 100 and a second light redirecting layer 200.

In some embodiments, the first light redirecting layer 100 may include a structured layer 115 including a plurality of truncated first structures 10 and a plurality of untruncated second structures 20. In some embodiments, the first light redirecting layer 100 may further include a substrate 50, upon which the first structures 10 and second structures 20 are disposed. In some embodiments, the first light redirecting layer 100 may be a monolithic layer, wherein there is no separate substrate 50 and the entire layer 100 is of a same material.

In some embodiments, the second light redirecting layer 200 may include a structured layer 215 including a plurality of truncated first structures 10 and a plurality of untruncated second structures 20. It should be noted that the first structures 10 and second structures 20 of the second light redirecting layer 200 are not visible in the embodiment shown in FIG. 1A, as they may be at an angle different from the first structures 10 and second structures 20 of the first light redirecting layer 100.

In some embodiments, the second light redirecting layer 200 may further include a substrate 50, upon which the structured layer 215 is disposed. In some embodiments, the second light redirecting layer 200 may be a monolithic layer, wherein there is no separate substrate 50 and the entire layer 200 is of a same material.

In some embodiments, the optical stack 300, for substantially normally incident light 60 and for at least one wavelength in an infrared wavelength range extending from about 750 nm to about 1100 nm, optical stack 300 may have a specular optical transmittance of between about 10% and about 80%, or between about 10% to 60%, or between about 10% to 50%, or between about 10% to 40%.

In some embodiments, the optical stack 300 may further include a reflective polarizer 70. In some embodiments, the reflective polarizer 70 may be disposed in the optical stack 300 such that the second light redirecting layer 200 is disposed between the reflective polarizer 70 and the first light redirecting layer 100. In some embodiments, for substantially normally incident light 60 and for a visible (i.e., human-visible) wavelength range extending from about 450 nm to about 650 nm, and for an infrared wavelength range extending from about 750 nm to about 1100 nm, the reflective polarizer may transmit at least 40%, or at least 45%, or at least 50% of the incident light 60 for a first polarization state (for example, p-pol light) for each wavelength in the visible wavelength range, reflects at least 70%, or at least 80%, or at least 90% of the incident light for an orthogonal second polarization state (for example, s-pol light) for each wavelength in the visible wavelength range, and transmits at least 40%, or at least 45%, or at least 50% of the incident light for each of the first and second polarization states for at least one wavelength in the infrared wavelength range. In some embodiments, the infrared wavelength range may be from about 850 nm to about 940 nm.

In some embodiments, there may be a separation, or gap 30, between the first light redirecting layer 100 and the second light redirecting layer 200. In some embodiments, first light redirecting layer 100 and second light redirecting layer 200 may be in contact with each other, or adhered by an adhesive layer (as will be discussed elsewhere herein).

In some embodiments, the structured layer 115 (and similarly, structured layer 215, although not visible in FIG. 1A) includes a plurality of truncated first structures 10 and a plurality of untruncated second structures 20. Each truncated first structure includes opposing side surfaces 11, 12 and a substantially planar top surface 13 joining the opposing side surfaces. Each untruncated second structure includes opposing side surfaces 21, 22 meeting at a peak 23. In some embodiments, the peaks 23 of the untruncated second structures 20 and the substantially planar top surfaces 13 of the first truncated structures 10 may lie substantially in a same plane P1.

Figure 1B:
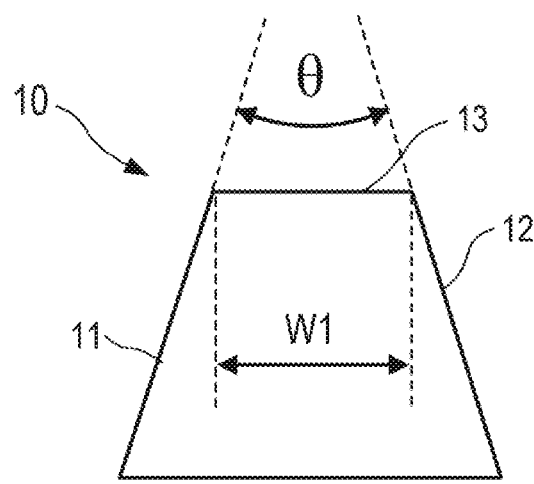
FIGS. 1B-1C provide side profile views of a truncated structure and an untruncated structure of the optical stack of FIG. 1A, in accordance with an embodiment of the present description.
Figure 1C:
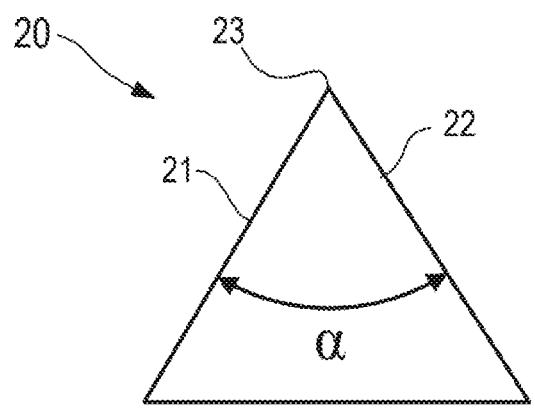

FIGS. 1B-1C provide side profile views of a typical truncated structure 10 and a typical untruncated structure 20 of optical stack 300 of FIG. 1A, respectively, according to an embodiment of the present description. FIG. 1B shows one possible embodiments of truncated structure 10. In some embodiments, truncated structure 10 has a planar top surface 13 with an average width W1. In some embodiments, W1 may be at least 2 microns, or at least 3 microns, or at least 4 microns. In some embodiments, truncated structure 10 has opposing side surfaces 11 and 12 joined by a substantially planar top surface 13. In some embodiments, opposing side surfaces 11 and 12 make an angle $\theta$ with each other of between about 60 degrees and about 120 degrees.

FIG. 1C shows one possible embodiment of untruncated structure 20. In some embodiments, untruncated structure 20 has opposing side surfaces 21 and 22 meeting at a peak 23. In some embodiments, opposing side surfaces 21 and 22 make an angle $\alpha$ with each other of between about 60 degrees and about 120 degrees.

Figure 1D:
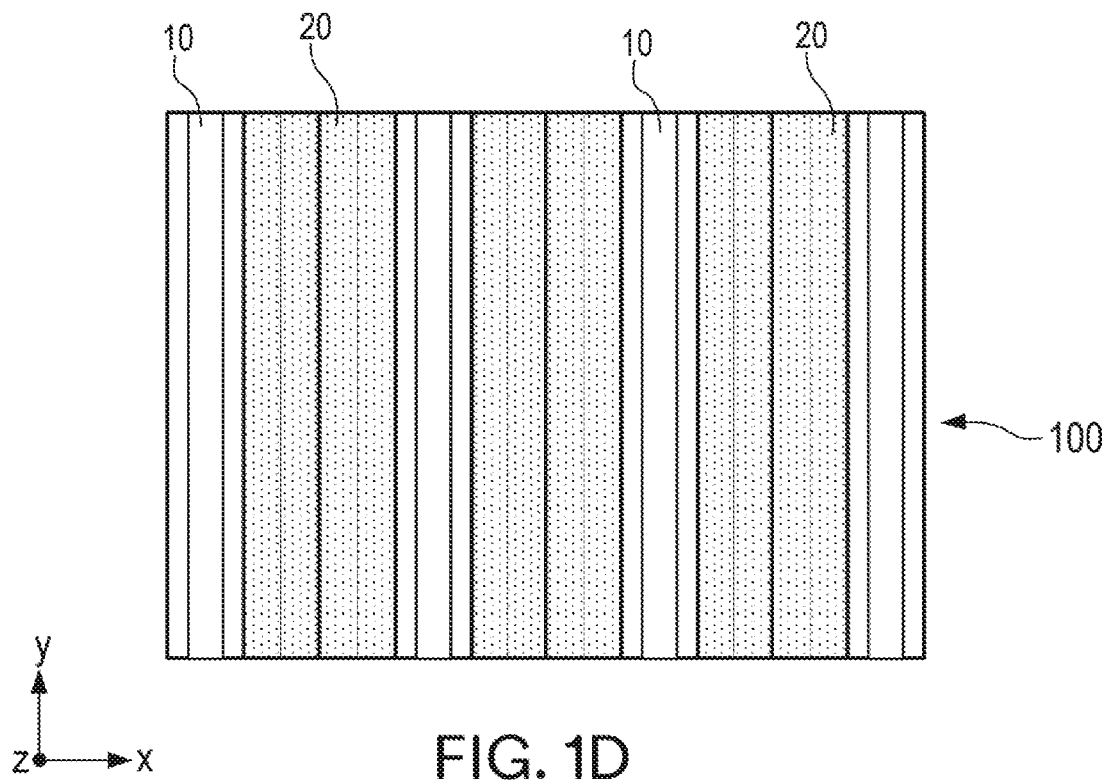
FIGS. 1D-1E provide top plan views of light redirecting layers of the optical stack of FIG. 1A, in accordance with an embodiment of the present description.
Figure 1E:
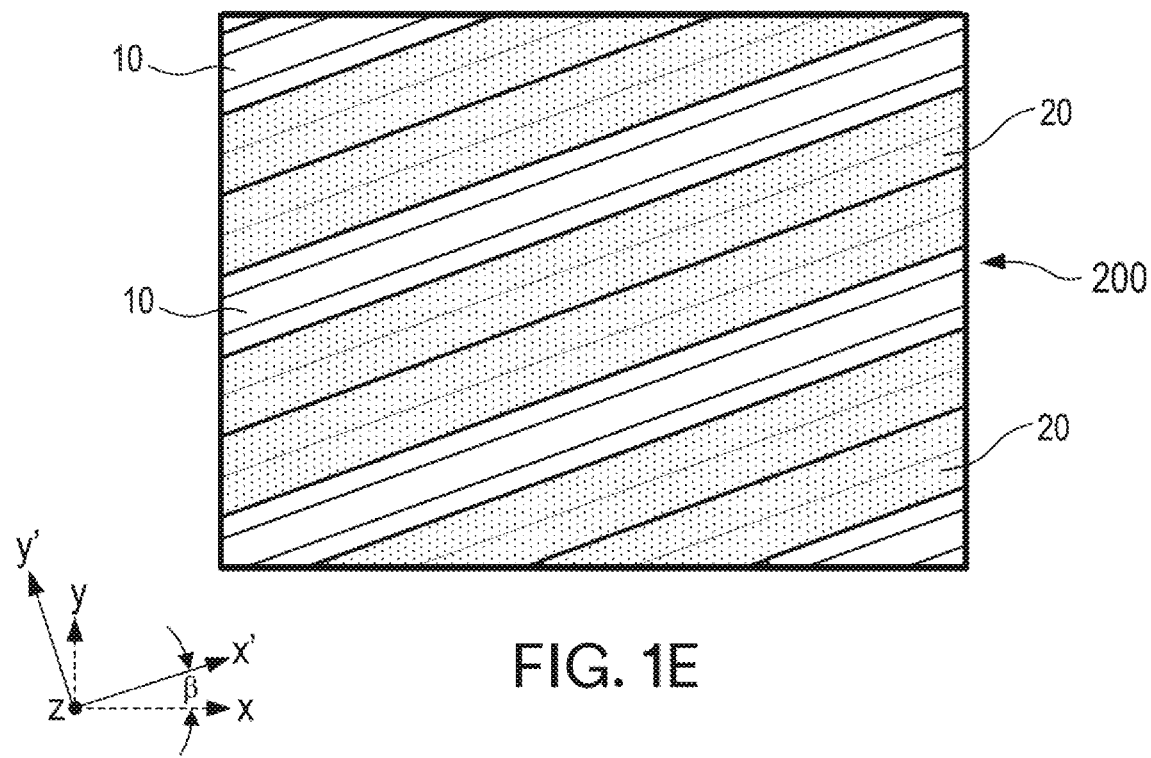

The orientation of the linear structures of the first light directing layer 100 and second light redirecting layer 200 may be significantly different. For example, in some embodiments, the orientation of the linear structures of the first light directing layer 100 and second light redirecting layer 200 may be orthogonal to each other. FIGS. 1D-1E provide top plan views of one embodiment of light redirecting layers 100, 200, respectively. In FIGS. 1D and 1E, it should be noted that the use of different fill patterns between first structures 10 and second structures 20 is only to provide visual distinction between the two types of structures and is not meant to imply a difference in material. In some embodiments, the material of first structures 10 and second structures 20 may be substantially the same material. Also, FIGS. 1D and 1E should be considered together, in that the orientation of one figure is meant to be shown relative to the orientation of the second figure.

FIG. 1D shows one embodiment of light redirecting layer 100, with linear truncated first structures 10 and linear untruncated second structures 20 extending in a first direction (i.e., the y-axis as shown in FIG. 1D) and arranged along an orthogonal second direction (i.e., the x-axis shown in FIG. 1D). The pattern of first structures 10 and second structures 20 shown in FIG. 1D is illustrative only, and not intended to be limiting in any way. First structures 10 and second structures 20 may be arranged in nearly any pattern, and in varying quantities of each type of structure, or may be disposed in a non-repeating, semi-random arrangement.

FIG. 1E shows one embodiment of light redirecting layer 200. In this embodiment, linear truncated first structures 10 and linear untruncated second structures 20 extending in a third direction (i.e., the x'-axis, as shown in FIG. 1E) and arranged along an orthogonal fourth direction (i.e., the y'-axis, as shown in FIG. 1E). In some embodiments, the second direction (x-axis of FIG. 1D) and the third direction (the x'-axis of FIG. 1E) make an angle $\beta$ of about 0 degrees to about 50 degrees with each other.

Figure 2:
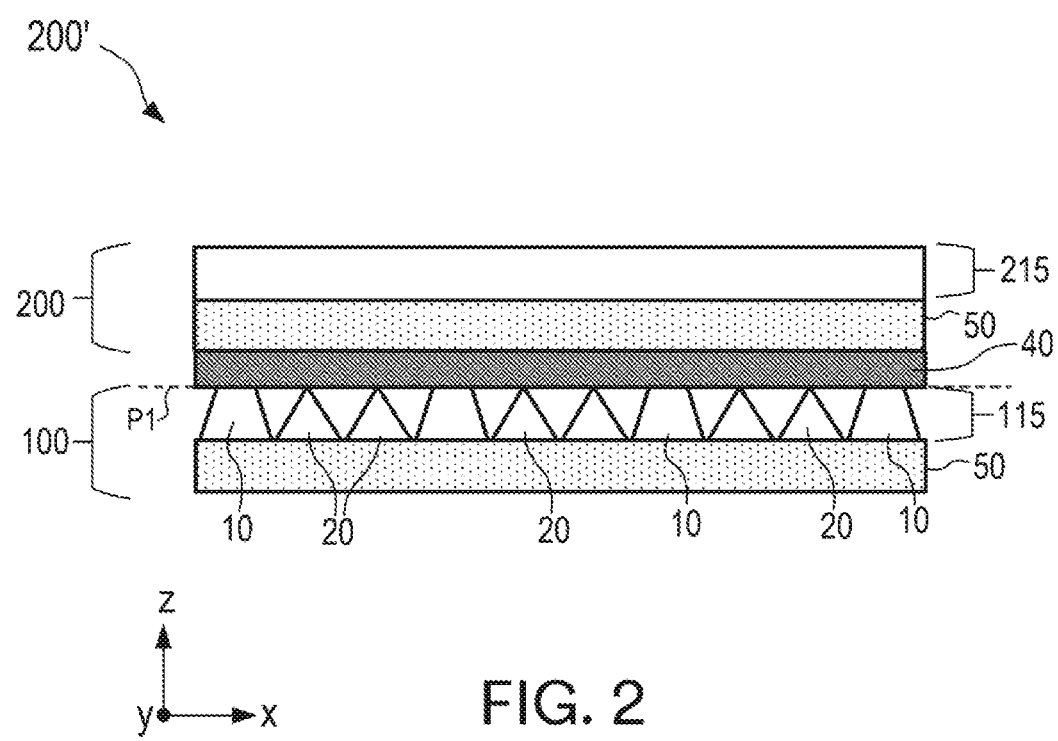
FIG. 2 is a side view of an optical stack with truncated structures and an adhesive layer, in accordance with an embodiment of the present description.

FIG. 2 is a side view of an optical stack 200' including an adhesive layer. FIG. 2 shows an optical stack 200' similar to the optical stack of FIG. 1A including first light redirecting layer 100 and second light redirecting layer 200. The reference designators in FIG. 2 shared in common with like reference designators in FIG. 1A describe similar components, and have a similar function as described for FIG. 1A unless specifically described otherwise. In the embodiment of FIG. 2, an adhesive layer 40 is disposed between and in contact with the first light redirecting layer 100 and second light redirecting layer 200, adhering layers 100 and 200. In some embodiments, a first surface of adhesive layer 40 rests on plane P1 and is in contact with first structures 10 and second structures 20 of first light redirecting layer 100 along plane P1. The bottom, unstructured surface of second light redirecting film 200 (e.g., a planar side of substrate 50, if present) is in contact with a second, opposing surface of adhesive layer 40. In some embodiments, adhesive layer 40 may include an optical adhesive. One example of an optical adhesive is a curable acrylate adhesive. In However, any appropriate type of adhesive may be used. In some embodiments, adhesive layer 40 may include particles or fillers which modify the optical properties of the layer. For example, adhesive layer 40 may include particles intended to scatter (i.e., diffuse) light passing through the layer.

Figure 3:
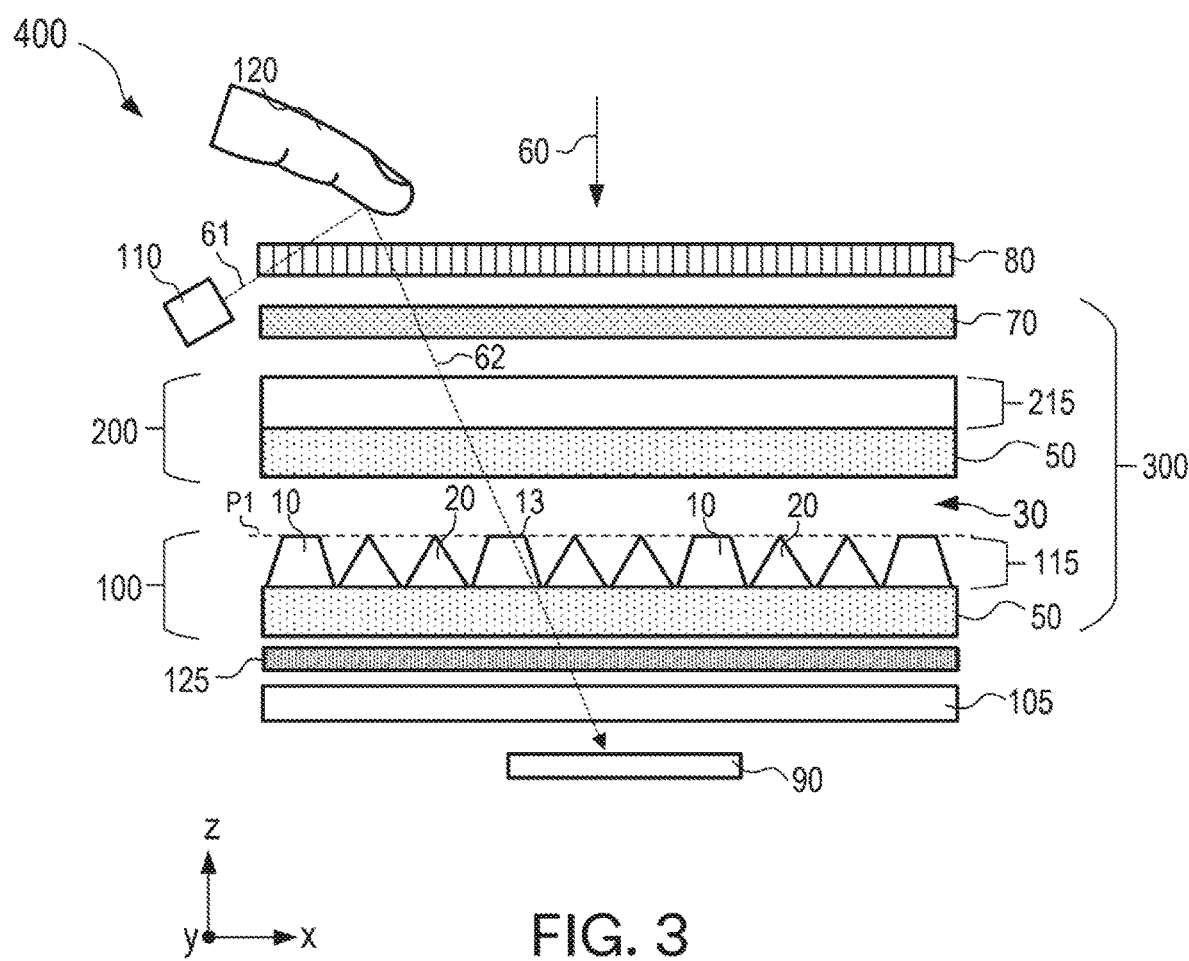
FIG. 3 is a side view of an optical system, in accordance with an embodiment of the present description.

Finally, FIG. 3 is a side view of an optical system including an optical stack, according to an embodiment of the present description. In some embodiments, optical system 400 may include a display panel 80 (e.g., a liquid crystal display), a light detector 90 (e.g., an infrared detector), a reflecting layer 105 disposed between the display panel 80 and the light detector 90, and optical stack 300, such as optical stack 300 of FIG. 1A.

In some embodiments, the optical system 400 may also include a diffuser layer 125. In some embodiments, diffuser layer 125 may include silica nanoparticles distributed in an acrylic polymer. In some embodiments, for substantially normally incident light and a human-visible (i.e., visible) wavelength range from about 450 nm to about 650 nm and an infrared wavelength range from 930 nm to 970 nm, the diffuser layer 125 may have an average total transmittance, $V_t$, and an average specular transmittance, $V_s$, in the visible wavelength range, and the diffuser layer 125 may have an average transmittance, $I_t$, and an average specular transmittance, $I_s$, in the infrared wavelength range. In some embodiments, the ratio of $I_s/I_t$ is greater than or equal to about 0.6, and the ratio of $I_s/V_s$ is greater than or equal to about 2.5.

In some embodiments, for substantially normally incident light 60 and for each of a first polarization state and a second polarization state, the reflecting layer 105 may reflect at least 70%, or at least 80%, or at least 90% of incident light 60 for each wavelength in the visible wavelength range, and transmits at least 70%, or at least 80%, or at least 90% of the incident light for the at least one wavelength in the infrared wavelength range.

In some embodiments, optical system 400 may also include a light source 110 (e.g., an infrared light source) for emitting light 61 having the at least one wavelength in the second wavelength range (i.e., the infrared wavelength range) toward an object 120 (e.g., a finger having a fingerprint) disposed proximate the optical system 400, the object 120 reflecting the emitted light (creating reflected light 62) toward light detector 90, the light detector 90 detecting reflected light 62. In some embodiments, reflected light 62 passes through one or more of the substantially planar flat surfaces 13 of truncated first structures 10, such that at least a portion of reflected light 62 reaches light detector 90 substantially undistorted. In some embodiments, optical system 400 may have a specular optical transmittance of between about 5% and about 20% for at least one wavelength in an infrared wavelength range extending from about 750 nm to about 1100 nm.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack comprising stacked first and second light redirecting layers, each light redirecting layer comprising:
   a plurality of truncated first structures, each truncated first structure comprising opposing side surfaces making an angle of between about 60 degrees to about 120 degrees with each other and a substantially planar top surface joining the opposing side surfaces; and
   a plurality of untruncated second structures, each untruncated second structure comprising opposing side surfaces making an angle of between about 60 degrees to about 120 degrees with each other and meeting at a peak, wherein the peaks of the untruncated second structures and the substantially planar top surfaces of the first truncated structures substantially lie in a same plane.

2. The optical stack of claim 1, wherein for the first light redirecting layer, the first and second structures are linear structures extending along a first direction and arranged along an orthogonal second direction, and for the second light redirecting layer, the first and second structures are linear structures extending along a third direction and arranged along an orthogonal fourth direction.

3. The optical stack of claim 2, wherein the second and third directions make an angle of about zero degree to 50 degrees therebetween.

4. The optical stack of claim 1, wherein an adhesive layer bonds the first and second light redirecting layers to each other.

5. The optical stack of claim 1, wherein for each of the first and second light redirecting layers, the first and second structures are disposed on a substrate.

6. The optical stack of claim 1, such that for substantially normally incident light and for at least one wavelength in an infrared wavelength range extending from about 750 nm to about 1100 nm, the optical stack has a specular optical transmittance of between about 10% and about 80%.

7. The optical stack of claim 6, wherein the optical stack has a specular optical transmittance of between about 10% to 60%.

8. The optical stack of claim 6, wherein the optical stack has a specular optical transmittance of between about 10% to 50%.

9. The optical stack of claim 6, wherein the optical stack has a specular optical transmittance of between about 10% to 40%.

10. The optical stack of claim 1, wherein for each of the first and second light redirecting layers, the top surfaces of the truncated first structures have an average width W1 of at least 2 microns.

11. The optical stack of claim 1, further comprising a reflective polarizer, the second light redirecting layer disposed between the reflective polarizer and the first light redirecting layer, such that for substantially normally incident light and for a visible wavelength range extending from about 450 nm to about 650 nm and an infrared wavelength range extending from about 750 nm to about 1100 nm, the reflective polarizer transmits at least 40% of the incident light for a first polarization state for each wavelength in the visible wavelength range, reflects at least 70% of the incident light for an orthogonal second polarization state for each wavelength in the visible wavelength range, and transmits at least 40% of the incident light for each of the first and second polarization states for at least one wavelength in the infrared wavelength range.

12. The optical stack of claim 11, wherein the at least one wavelength in the infrared wavelength range is one or more of about 850 nm and about 940 nm.

* * * * *